UNITED STATES PATENT OFFICE.

JOHN J. C. SMITH, OF PASSAIC, NEW JERSEY.

COMPOSITION FOR MOLDS.

950,355.

Specification of Letters Patent. Patented Feb. 22, 1910.

No Drawing.

Application filed April 1, 1909. Serial No. 487,168.

*To all whom it may concern:*

Be it known that I, JOHN J. C. SMITH, a citizen of the United States, residing at Passaic, in the county of Passaic and State of New Jersey, have invented certain new and useful Improvements in Compositions for Molds; and in order that others skilled in the art may understand and practice my invention I give the following specification.

My invention relates to compositions for making molds or matrices for use in casting metals, and more particularly for use in making stereotypes or for reproduction in metal of designs possessing fine details, and it has for its object to produce a mold which will faithfully reproduce and retain the finest details of the designs or patterns; withstand the heat of the molten metal, be free from tendency to crack or check; have superior tenacity to enable it to be withdrawn cleanly from the patterns, and have when set and hardened a degree of porosity sufficient to permit the escape of air and gases therethrough in the casting operation, and also possesses other superior characteristics and advantages which will more fully hereinafter appear.

For producing a molding material having the above characteristics, I take an argillaceous material of fine texture and good tenacity and plasticity. I have found potter's clay of fine texture to be well suited to the purpose of the invention and therefore preferably use this material. I take said argillaceous material or fine potters' clay and form thereof, with the addition of water, a thick cream-like slush. I then take a suitable quantity of fine short asbestos fiber and mix the same with water, by active agitation and stirring, to bring it to a consistency similar to that of the clay slush. I next thoroughly mix the clay and asbestos slushes together in equal proportions by volume. This mixture may be kept in this condition, and is always ready to be mixed with plaster of paris as hereinafter described. Instead of the fine asbestos fiber above mentioned, I may use finely ground silicate or silicious material or pumice stone and obtain satisfactory results, but I prefer to use asbestos as stated. After the materials are in the condition above described, the pattern or design which it is desired to reproduce is suitably prepared and arranged for taking the mold. When this is done, I mix sufficient plaster of paris with water to bring the same into a thick cream-like consistency. To the plaster so prepared I add about one-third of its volume of the clay and asbestos mixture above described, and mix the same thoroughly by well stirring, when the molding composition is ready to be poured upon the pattern or design. The composition will settle and flow into the finest detail of the design and when set or hardened will give an exact reproduction thereof to the finest and most delicate details. After allowing the composition to remain on the pattern for about twenty or thirty minutes, the mold will have hardened sufficiently to be removed from the patterns. After removal the molds are placed in a drying oven and heated to a temperature of about 600° F. for a period of from two to three hours, to eliminate all moisture.

This molding composition I use in connection with my method and apparatus for casting stereotype plates described in another application filed on even date herewith, Ser. No. 487,169, April 1, 1909.

It will be found that the molds so produced will not only take and reproduce faithfully the most intricate designs, but will not suffer any deterioration or damage, such as shrinking or cracking, either from the heat to which they are subjected in drying or from the heat of the molten metal cast therein. It will also be found that the molding material is of such tenacity that it will withdraw clean and perfectly from the pattern. It will also be found that the mold will possess a superior degree of strength and tenacity to enable it to resist the pressure employed when metal is cast therein under pressure.

By the use of molds, made in accordance with my invention and their superior resistance to heat, I am enabled to use them especially for casting stereotype plates of metals of greater hardness and consequently having a higher melting temperature than metals now employed for this purpose, and am also able to produce stereotypes of such metal possessing the finest of detail, which is now obtained only by the use of electrotypes.

What I claim is:

1. A composition for molds, consisting of clay, finely divided asbestos fiber and plaster of paris.

2. A mold for the purposes described formed of clay, asbestos fiber and plaster of paris.

JOHN J. C. SMITH.

Witnesses:
 H. R. HORBACH,
 H. C. WORKMAN.